United States Patent [19]

Wiggerman

[11] 3,927,314
[45] Dec. 16, 1975

[54] BOW LIGHT FOR WATER CRAFT
[75] Inventor: Ronald E. Wiggerman, Grand Rapids, Mich.
[73] Assignee: Attwood Corporation, Lowell, Mich.
[22] Filed: Nov. 14, 1974
[21] Appl. No.: 523,691

[52] U.S. Cl.................................. 240/7.5; 240/8.41
[51] Int. Cl.² ......................................... B63B 45/04
[58] Field of Search.................... 240/7.5, 8.4, 8.41; 116/26, 114 AJ, DIG. 5

[56] References Cited
UNITED STATES PATENTS

| 173,140 | 2/1976 | Sherman | 240/7.5 |
|---|---|---|---|
| 2,245,755 | 6/1941 | Carpenter | 240/8.4 |
| 3,192,376 | 6/1965 | Najimian | 240/7.5 |
| 3,254,206 | 5/1966 | Martelet | 240/7.5 |
| 3,344,264 | 9/1967 | Perkins | 240/7.5 |

FOREIGN PATENTS OR APPLICATIONS

| 503,549 | 6/1954 | Canada | 240/7.5 |
|---|---|---|---|
| 621,538 | 10/1935 | Germany | 240/8.4 |

Primary Examiner—Joseph F. Peters, Jr.
Assistant Examiner—Alan Mathews
Attorney, Agent, or Firm—Price, Heneveld, Huizenga & Cooper

[57] ABSTRACT

A bow light assembly for water craft includes light transmitting means at the rear face thereof and arranged to transmit rays from the light source for the front lens to indicate to the operator when the bow light assembly is operating. This invention additionally provides a means for orienting and establishing the proper position of the separate green and red lenses when the light is originally assembled and additionally at re-assembly when the light has been opened for replacement of its internal light source.

4 Claims, 5 Drawing Figures

BOW LIGHT FOR WATER CRAFT

BACKGROUND OF THE INVENTION

This invention relates to bow lights for water craft and more particularly to a bow light having novel indicator means incorporated therein which provides an indication to the operator whether or not the light is on and which additionally helps to establish the proper position of the different color lenses during assembly of the bow light.

Navigational laws require that motorized water craft carry various running lights during navigation at night or at other times of limited visibility. Typically a water craft must include red and green running lights positioned for visibility from opposite sides of the craft. The red light is positioned to the port or the left side of the craft while a green light is positioned for viewing at the starboard or right side.

A typical bow light generally includes a single light source such as an electric bulb positioned within a housing. The housing includes colored transparent or translucent lenses illuminated by such light source. By the position of the colored lights, neighboring water craft may readily ascertain the direction of movement of the craft carrying the light. To satisfy navigational requirements the light beams emitted from the lenses are positioned for viewing over a particular range. In Class A and Class 1 motor boats for example, the light is positioned at the forepart of the craft showing red to the port side and green to the starboard from directly ahead of the craft to approximately two points abaft the beam. More generally stated, the lenses are so shaped, separated and positioned within the housing such that the light beam projected therefrom will be visible forwardly and laterally of the craft, but not from the rear.

Since the light is located forwardly of the operator it is difficult if not impossible for him to determine if the light is actually operative. Additionally, when the light source contained within the assembly is replaced, it is possible that the colored lenses will be positioned on the wrong side or reversed. That is, the red and green lenses are switched. This situation can and indeed has caused accidents. Neighboring water craft are erroneously led to believe that the craft on which the light is mounted is travelling in the opposite direction.

The typical bow light is designed to be symmetrical about its center because of aesthetic reasons and navigational requirements. In addition, tooling and manufacturing costs would be increased if differing configurations of lenses are utilized. Therefore it is desirable to retain the symmetrical shape and to have identical but different colored lenses contained within the bow light.

SUMMARY OF THE INVENTION

The present invention improves upon bow lights for water craft. It overcomes those difficulties encountered in the prior art with respect to the determination of whether the light source contained within the housing is operative and in addition serves as a guide to orient and establish the proper positioning of the lenses within the housing when it is assembled.

In this invention, the bow light assembly housing includes a back wall from which the lenses or the signal light emitted therefrom is not viewable. The light source is positioned within the housing to transmit light forwardly through the different colored lenses. The improvement of the present invention provides a small light transmitting means arranged to transmit from the light source light rays which provide a visible indication to the operator when the light source is on. The rear light transmitting means comprises two elements of the same color as the lens immediately in front of it so as to provide an orientation mechanism to insure that the positions of the different color lenses at the front are correct.

Additional advantages and features of the invention will become apparent to those skilled in the art upon reading the following description and with reference to the accompanying drawings illustrating a preferred embodiment of the invention.

DESCRIPTION OF THE PREFERRED EMBODIMENT

Figure 3:
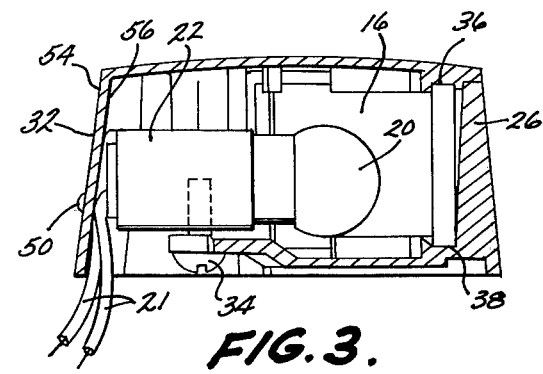
FIG. 3 is a cross-sectional view taken along the plane III—III of FIG. 2.

Referring now to the drawings, a bow light assembly generally designated by the numeral 10 includes a base member 12 and a cover member 14 fixed together to form a housing for a pair of different colored lenses. A first, red colored lens 16 is viewable from the port or left side of the craft while a green lens 18 is positioned at the opposite side. An electric lamp 20 providing a light source is seated in a conventional socket 22 retained within the housing and adapted to project light through the lenses 16 and 18. Electrical leads 21 extend from socket 22 for connection to a suitable electrical power source. For convenience in discussion, the portion of the bow light facing forwardly when installed on a water craft is referred to herein as the front portion 24 while the side of the bow light carrying the red lens is designated port side 28 and the side portion carrying the green lens is designated starboard side 30. It will be noted that a divider bar 26 extends upwardly from the base 12 between the red and green lenses to provide a distinct separation between the port and starboard sides 28 and 30. A backwall portion designated portion 32 forms the rear of the lamp assembly. The base 12 and cover 14 are secured together as by one or more screws 34 (FIG. 3) in a convenient manner. Lenses 16 and 18 are positioned in annular slots 36 and 38 located on the inner surfaces of the cover and base respectively. It will additionally be noted that the lenses 16 and 18 are slightly recessed with respect to the front portion 24 and sides 28 and 30. A step 40 positioned midway along sides 28 and 30 on each side of the assembly prevents viewing of the light projected through the lenses from the rear of the bow light assembly.

Base 12 and cover 14 may be formed conveniently of cast metal, plastic or alloy of any suitable type. The lenses 16 and 18 may be formed of plastic-like material, glass or other suitable translucent material. Mounting openings 42 are provided in the base at the sides thereof for convenient mounting of the assembly to the deck of a water craft.

Figure 4:
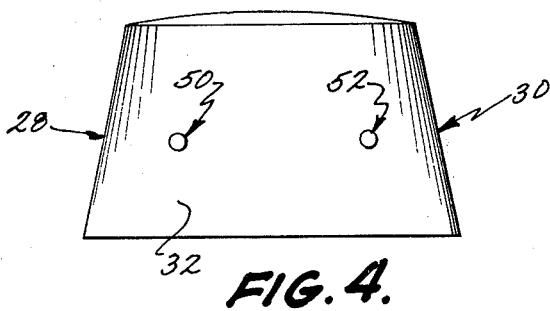
FIG. 4 is a rear view of the bow light illustrating the placement of the indicator means.
Figure 5:
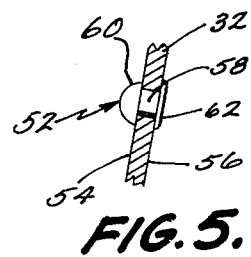
FIG. 5 is an enlarged cross-sectional view taken along the plane V—V of FIG. 2 illustrating the indicator means positioned in the back wall of the bow light assembly.

Referring to FIGS. 4 and 5, the indicator means of the invention comprising the light transmitting elements 50 and 52 are positioned within backwall 32 for convenient viewing by the operator. The indicator means are colored and are formed as a pair of small button like lenses extending through the backwall from the exterior surface 54 to the interior surface 56. Spaced apart openings through the backwall receive the elements 50 and 52. Element 50 adjacent port side 28 of the assembly (i.e., immediately behind red lens 16) is red while element 52 positioned adjacent the starboard side 30 (i.e., immediately behind the green lens 18) is green. Elements 50 and 52 are identical in construction and are installed in a similar manner. The only difference resides in the fact that element 50 at the port side is similarly colored red while element 52 at the starboard side is green. Elements 50 and 52 preferably are formed of acrylic plastic and each have an elongated shank 58 and an enlarged head 60 (FIG. 5). The head preferably has a high optical polish finish.

To retain the elements within the back wall it may conveniently be inserted through the opening provided therein where it is heat staked as indicated at 62 at the inner surface 56 of the back wall. The elements are thus permanently retained within the assembly.

Figure 1:
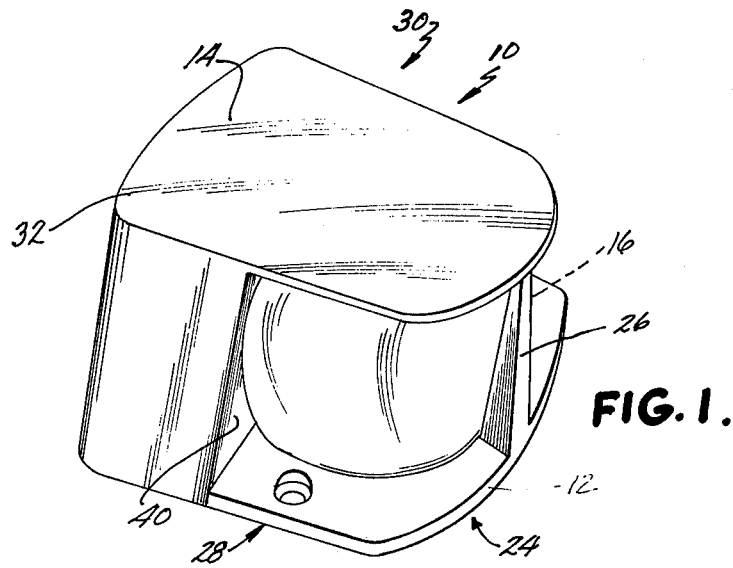
FIG. 1 is a perspective view of a typical bow light in which the present invention may be incorporated.
Figure 2:
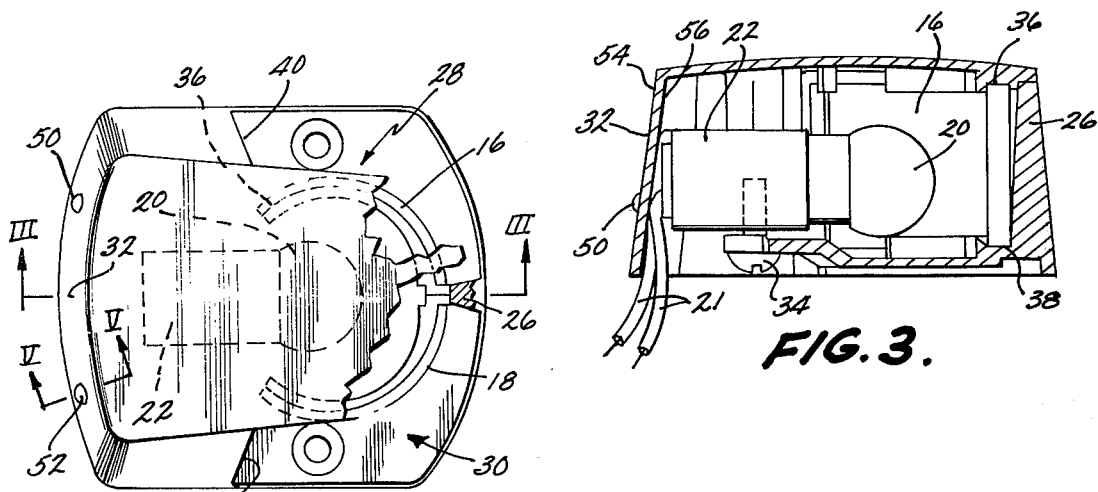
FIG. 2 is a top plan view of the bow light incorporating the present invention.

With reference again to FIGS. 2 and 3, it will be noted that the light source 20 is positioned within a cavity formed within the housing between the base and cover. Light is projected from the source when power is applied to the bulb 20. Light emitted therefrom toward the inner wall surface 56 of the back wall 32 is transmitted through the elements 50 and 52 to cause a slight glow at the head portion 60 of each element so that the water craft operator will immediately be able to determine that the bow light is operational.

The additional feature and advantage of the indicator resides in the fact that the indicators are permanently mounted in the rear wall of the housing. Should it become necessary to replace bulb 20 or to make other repairs on the assembly, it is necessary to remove the base from the cover by removing screw 34. As the base and cover are separated, lenses 16 and 18 normally are free for removal since they are normally retained in slots 36 and 38. When the bow light is reassembled it is typically held in an up-side-down position as the lenses are positioned therein and the base is placed on the cover and screws 34 are inserted. To insure that the lenses are positioned correctly (that is, red on the port side and green on the starboard side) it is necessary only to check that red lens 16 is in alignment with red element 50 and that green lens 18 is positioned on the same side as the permanently affixed green element 52. The possibility of error in reassembling the bow light is therefore considerably reduced.

Those skilled in the art will immediately recognize the many advantages and attendent features of a bow light incorporating the novel indicator means of the invention. The possibility of error at assembly is considerably reduced and in addition it is possible for the operator to determine at a glance if the bow light is operative. Those skilled in the art will also recognize that other embodiments and modifications incorporated in the teachings of the invention may readily be made in light of the disclosure. Accordingly, all modifications employing the principles of the invention are to be considered as included in the appended claims unless these claims by their language expressly state otherwise.

The embodiments of the invention in which an exclusive property or privilege is claimed are defined as follows:

1. In a bow light for water craft having a housing; lens means in said housing viewable forwardly and from the sides of said housing, said lens means including a pair of lenses adapted to emit light beams of different colors forwardly at opposite sides of said bow light; a wall on said housing obstructing viewing of said lens means from the rear thereof; and a light source in said housing adapted to emit light through said lens means, the improvement comprising: light transmitting means positioned in and extending through said wall, said light transmitting means being responsive to operation of said source to transmit light rays from said light source to the rear of said housing to thereby provide an indication at said wall when said light source is operative, said light transmitting means including a pair of light transmitting elements positioned in said wall and at generally opposite sides thereof, each said transmitting element being of the same color as the color emitted by said lens on its side.

2. The bow light of claim 1 wherein said light transmitting means each comprise a translucent member having a head portion and a shank, said backwall having openings therethrough to receive said shank, said head portion being adapted for abutment with the outer surface of said backwall when said shank portion extends through said wall and into the interior of said housing.

3. A bow light for water craft comprising: a base member adapted for mounting on the deck of a water craft; a cover member adapted for positioning on said base member to form a housing; source means in said housing for emitting a beam of light; a pair of lens members symmetrically disposed on each side of a center line of said housing, said lens members each being adapted to project a beam of light of differing color and to emit a light at the front and sides of said housing through a predetermined angular range, said housing having a wall surface formed thereon to prevent light transmission rearwardly thereof; light transmission means formed in said wall and communicating with the interior of said housing and being capable of transmitting light emitted from said source means to indicate operation of said source means, said light transmission means including a pair of light transmission elements, said pair of elements being spaced apart on said wall surface and being of differing colors corresponding to the colors of said lens members, the corresponding colored lens and said elements being positioned on the same side of said center line of said housing.

4. The bow light of claim 3 wherein said base and said cover cooperatively and removably retain said lens members in said housing, said lens members being of the same configuration so that either lens could be mounted on either side of said housing; said elements providing referencing means by color for assembling of said lens members in said housing in their proper positions.

* * * * *